April 14, 1925.
G. L. E. KLINGBEIL
SPRING SPREADER
Filed May 23, 1924
1,533,994
2 Sheets-Sheet 1
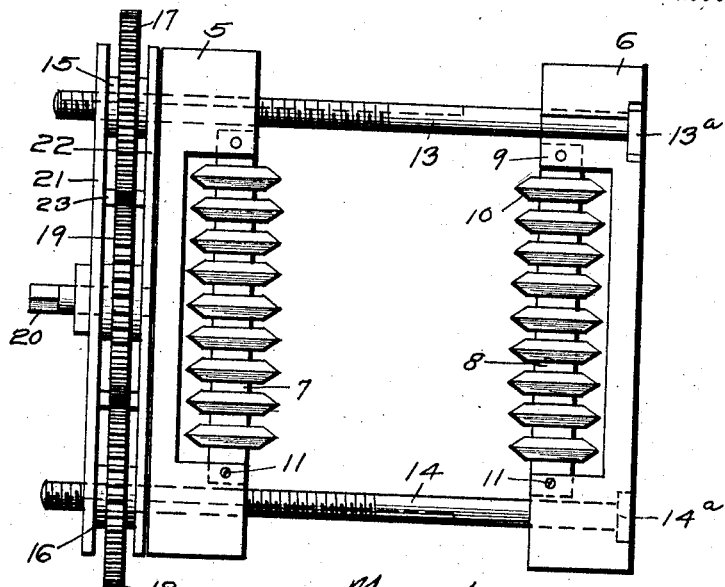
Fig. 1.
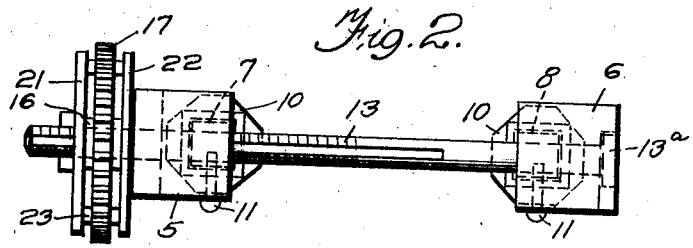
Fig. 2.
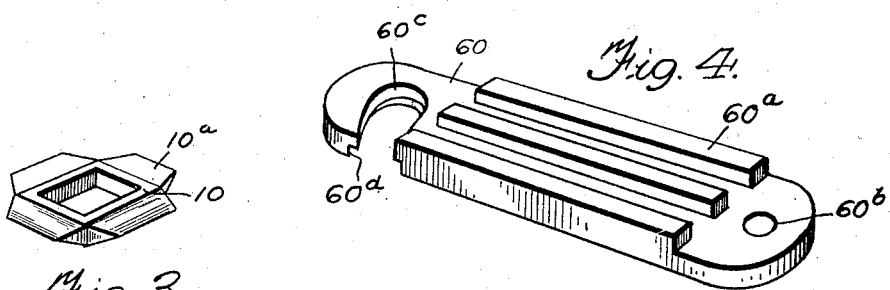
Fig. 3.
Fig. 4.
Inventor
G. L. E. Klingbeil,
By Samuel Herrick
Attorney

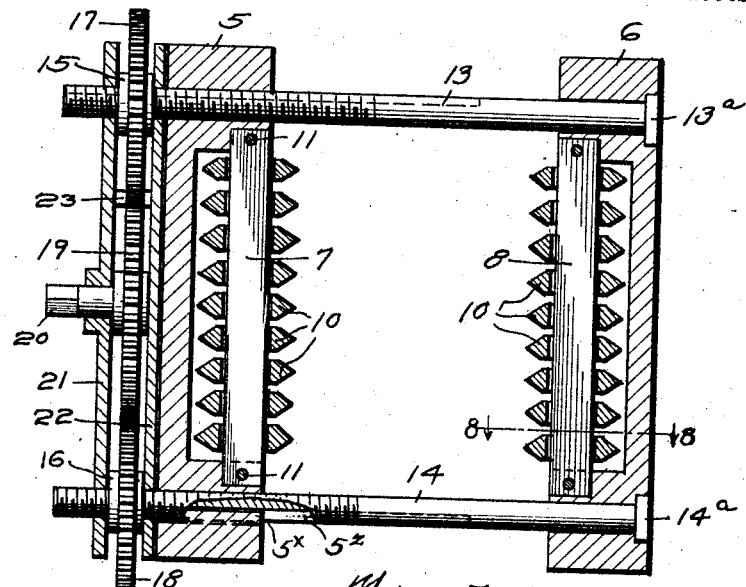
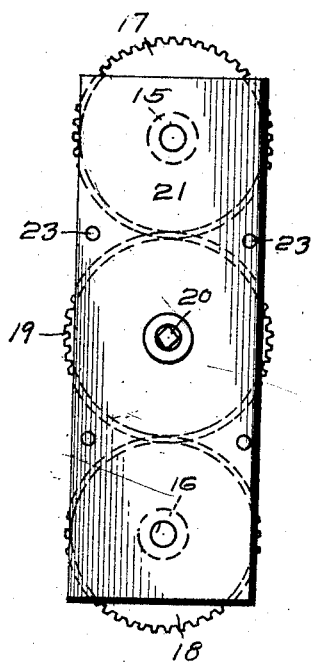
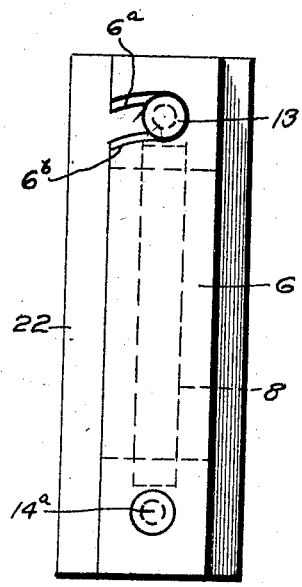
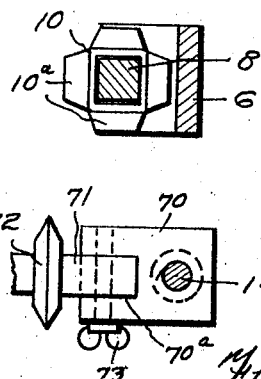

Patented Apr. 14, 1925.

1,533,994

UNITED STATES PATENT OFFICE.

GOTTLIEB L. E. KLINGBEIL, OF OMAHA, NEBRASKA, ASSIGNOR TO CENTRAL TRADING COMPANY, OF DOVER, DELAWARE.

SPRING SPREADER.

Application filed May 23, 1924. Serial No. 715,444.

*To all whom it may concern:*

Be it known that I, GOTTLIEB L. E. KLINGBEIL, a citizen of the United States, residing at Omaha, in the county of Douglas and State of Nebraska, have invented certain new and useful Improvements in Spring Spreaders, of which the following is a specification.

This invention relates to a spring spreader and it has for its object to provide an improved device of this character by means of which the leaves of automobile and other vehicle springs may be readily separated for the purpose of permitting the insertion of lubricant therebetween.

Much of the so called "hard riding" of automobiles and many of the squeaks may be attributed to improper lubrication of the springs.

The device of the said invention is similar to that shown in my co-pending application Serial No. 699,756, filed on the 17th day of March, 1924, in that it comprises two elements movable toward and from each other under the influence of screws said elements carrying banks of wedges adapted to enter between and separate the leaves of the springs.

The present invention relates to an improved manner of mounting the wedges and to an improved form of wedge, each wedge having a multiplicity of points, so that when one point becomes dulled the wedge may be turned and another point brought to position to do the work.

Further objects and advantages of the invention will be set forth in the detailed description which follows: In the accompanying drawings:

Fig. 1 is a side elevation of a spring spreader constructed in accordance with the invention.

Fig. 2 is an edge elevation thereof.

Fig. 3 is a perspective view of one of the wedges.

Fig. 4 is a perspective view of a plate which may be substituted for one of the wedge carrying blocks, if desired.

Fig. 5 is a sectional view through the wedge carrying blocks and associated parts.

Fig. 6 is a left end elevation.

Fig. 7 is a right end elevation; and

Fig. 8 is a transverse sectional view upon line 8—8 of Fig. 5, and Fig. 9 illustrates a modified form hereinafter described.

Like numerals designate corresponding parts in all the figures of the drawings.

In the drawings 5 and 6 indicate the opposed wedge carrying blocks said blocks being notched out on their confronting faces, as indicated at 7 and 8 for the reception of wedge carrying bars 9 upon which the wedges 10 may be strung. The bars 9 are held in place in the block by set screws 11. The shape of these wedges is clearly illustrated in Fig. 3 where it will be seen that they are substantially square at their central portions and have wedge points 10$^a$ upon each side. Thus when one point becomes worn from use the wedge may be given a quarter turn to bring another and new point into position for use. This is accomplished by removing the set screws 11 and lifting the wedge bars out of the blocks 5 and 6 after the blocks have been disengaged from the operating screws 13 and 14. It is to be understood that the screws 13 and 14 do not turn, but upon the contrary block 6 is engaged with the headed ends of these screws indicated at 13$^a$ and 14$^a$ and that the block 5 may be moved by nuts which engage the threads of the screws 13 and 14 said nuts constituting the hubs 15 and 16 of gear wheels 17 and 18.

The gear wheels 17 and 18 are actuated by intermediate gear wheel 19 to which rotation may be imparted through the medium of a suitable tool, not shown, adapted to be engaged with an angular end 20, constituting the shaft of gear 19. The gears 17, 18 and 19 are supported between spaced plates 21 and 22. These plates are spaced from each other and are tied together by posts 23.

It is to be understood that any number of gears may be employed and any ratio of gearing may be employed, it being only necessary in order to carry out the invention, to provide one operating gear which in turn engages through any suitable intermediate gearing with the gears which engage the screws 13 and 14, so that the same degree of movement will be imparted to each end of block 5.

The screw 14 passes through bar 9 and block 6 and its head 14$^a$ is countersunk in the outer face of the block 6. This screw constitutes a pivot upon which the block 6 may be bodily swung. The other end of said block may be disengaged from screw 13, during the time that the device is being engaged around a vehicle spring. To this end the said other end of block 6 is slotted as at 6ª and outwardly of said block is provided with a recessed portion 6ᵇ in which this head 13ª of the screw 13, moves.

While two banks of wedges are useful I have found that it is possible to separate the leaves of the springs for the purpose set forth by using only one bank of wedges and I contemplate substituting for the block 6 a plate 60 which is illustrated in Fig. 4. This plate is provided with ribs 60ª upon its inner face over which the leaves of the springs slide during the separating operation. The opening 60ᵇ is the opening through which the screw 14 will pass and the slotted portions 60ᶜ and 60ᵈ correspond to the slotted portions 6ª and 6ᵇ of Fig. 7 and serve the purpose described with respect to those portions.

This tool is primarily intended for use in garages where it will have to be capable of operating upon springs having leaves of varying thickness. In other words the leaves of the springs of one automobile may vary materially in thickness from those of another automobile. Thus it is very desirable to provide a structure of such nature that the wedges may be readily varied in thickness by the substitution of a thicker or thinner set of wedges as the occasion may require. The structure herein shown and described admirably adapts itself to this purpose since, by the removal of the set screws 11, the bars may be wholly removed from the block and the wedges rapidly strung thereon. Furthermore it is not essential that the screws 13 and 14 pass through the wedge carrying bars, since these bars may lie wholly inwardly of the screws as illustrated in the modified form in Fig. 9, wherein 70 is the block, 71 is the wedge carrying bar and 72 indicates a wedge thereon. The outer end of the bar engages slotted portions 70ª of block 70 and is held in place by a set screw 73. However it will be noted that the screw 14 lies outwardly of bar 71 and thus, by merely removing said screw 73 the bar with its bank of wedges may be slipped out of engagement with the block. Thus one set of wedges may be removed and another set substituted, without disengaging the block from the operating screws. For preventing the screws 13 and 14 from turning I provide ribs 5ˣ on block 5 which engage in grooves 5ᶻ of said screws.

It is to be understood that the invention is not limited to the precise construction set forth but that it includes within its purview whatever changes fairly come within either the terms or the spirit of the appended claims.

Having described my invention what I claim is:

1. A device of the character described comprising a wedge supporting block, a wedge bar angular in cross section removably engaged with the block and a bank of wedges strung upon said bar and held against turning with respect thereto by their configuration.

2. A structure as recited in claim 1 wherein said wedges comprise a multiplicity of operating points adapted to be successively brought into operation by being turned to a new position upon the bar.

3. In a device of the character described the combination with a supporting element, of a plurality of wedges non-rotatively mounted thereon and supported thereby, each of said wedges having a multiplicity of operating points adapted to be successively brought into operation by being turned to a new position with respect to said supporting element.

4. A device of the character described comprising a pair of elements a pair of screws on which said elements are supported, means engaged with the screws for forcing said elements toward each other, one of said elements carrying a wedge carrying bar which is angular in cross section and a plurality of wedges strung upon said bar and held by its angular shape from turning with respect thereto.

5. A structure as recited in claim 4 wherein said bar is removably engaged with said element and wherein said wedges are each provided with a multiplicity of points adapted to be successively brought into operation by being turned with respect to said bar.

6. A device of the character described comprising a supporting block, notched out at its opposite ends, a bar seated in said notched out portions and held in position therein by set screws and a plurality of wedges strung upon said bar, said bar and wedges being provided with interengaging means for holding the wedges against turning.

7. A device of the character described comprising a pair of wedge blocks, a pair of wedge bars angular in cross section carried thereby, a bank of multiple pointed wedges upon said bars, screws passing through said blocks and means engaged with said screws and operating upon each of said screws simultaneously, for moving the blocks forcibly toward each other.

8. A device of the character described comprising a pair of wedge blocks, a pair of wedge bars carried thereby, a bank of wedges upon said bars, screws passing through said blocks and means engaged with said screws and operating upon each of said screws simultaneously for moving the blocks forcibly toward each other, said wedges being movable to varying positions around said bars and in such varying positions presenting different points of contact to the work.

9. A structure as recited in claim 8, in combination with means for holding the screws against turning with respect to one of said wedge blocks while permitting said wedge block to move longitudinally of said screws.

10. In a device of the character described, the combination with a block and means for imparting bodily movement to said block, a wedge bar mounted upon said block for bodily removal therefrom and a plurality of wedges strung upon said bar, each of said wedges having a plurality of points which may be successively brought into operation by turning the wedges to new positions with respect to the said bar, said bar and wedges being provided with interengaging means for holding the wedges against turning.

In testimony whereof he affixes his signature in the presence of two witnesses.

GOTTLIEB L. E. KLINGBEIL.

Witnesses:
E. A. PIPAL,
EVANS Z. HORNBERGER.